United States Patent
Shedletsky et al.

(10) Patent No.: US 10,575,156 B2
(45) Date of Patent: Feb. 25, 2020

(54) MULTI-DEVICE WIRELESS DISABLE AND ENABLE

(71) Applicant: Apple Inc., Cupertino, CA (US)

(72) Inventors: Anna-Katrina Shedletsky, Mountain View, CA (US); Fletcher R. Rothkopf, Los Altos, CA (US); Jaseem Aliyar, San Jose, CA (US); Samuel Bruce Weiss, Los Altos Hills, CA (US)

(*) Notice: Subject to any disclaimer, the term of this patent is extended or adjusted under 35 U.S.C. 154(b) by 0 days.

(21) Appl. No.: 14/915,632

(22) PCT Filed: Aug. 29, 2013

(86) PCT No.: PCT/US2013/057417
§ 371 (c)(1),
(2) Date: Feb. 29, 2016

(87) PCT Pub. No.: WO2015/030783
PCT Pub. Date: Mar. 5, 2015

(65) Prior Publication Data
US 2016/0227600 A1  Aug. 4, 2016

(51) Int. Cl.
*H04W 4/80* (2018.01)
(52) U.S. Cl.
CPC .................. *H04W 4/80* (2018.02)
(58) Field of Classification Search
CPC .................. H04W 4/80; H04W 52/0235
USPC .................. 455/41.1–41.3
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |

(Continued)

FOREIGN PATENT DOCUMENTS

| | | |
|---|---|---|
| CN | 1568579 A | 1/2005 |
| EP | 1473951 A2 | 11/2004 |

(Continued)

OTHER PUBLICATIONS

International Search Report dated May 6, 2014, for International Application No. PCT/US2013/057417, filed Aug. 29, 2013, three pages.

(Continued)

*Primary Examiner* — Edward F Urban
*Assistant Examiner* — Rui M Hu
(74) *Attorney, Agent, or Firm* — Morgan, Lewis & Bockius LLP

(57) ABSTRACT

A wireless device configured to selectively enable and disable functionality when another wireless device that is paired to it is set to enable and disable functionality is provided. The wireless device can mirror the settings of a paired device such that when the paired device is set to airplane mode, the wireless device can automatically be set to airplane. Furthermore, when the airplane mode is disabled in the paired device, the wireless device can automatically disable its own airplane mode.

26 Claims, 7 Drawing Sheets

(56) References Cited

U.S. PATENT DOCUMENTS

| | | | |
|---|---|---|---|
| 7,015,894 B2 | 3/2006 | Morohoshi | |
| 7,184,064 B2 | 2/2007 | Zimmerman et al. | |
| 7,551,930 B2* | 6/2009 | Lempio | H04M 1/72572 |
| | | | 455/456.3 |
| 7,663,607 B2 | 2/2010 | Hotelling et al. | |
| 8,479,122 B2 | 7/2013 | Hotelling et al. | |
| 9,031,582 B2* | 5/2015 | Mohr | H04W 8/245 |
| | | | 455/41.2 |
| 9,363,010 B2* | 6/2016 | Lee | H04W 76/14 |
| 2003/0143954 A1* | 7/2003 | Dettinger | H04M 1/7253 |
| | | | 455/46 |
| 2004/0242258 A1 | 12/2004 | Kim | |
| 2005/0206503 A1* | 9/2005 | Corrado | G06K 7/10079 |
| | | | 340/10.5 |
| 2006/0092897 A1* | 5/2006 | Pirila | H04W 48/02 |
| | | | 370/338 |
| 2006/0197753 A1 | 9/2006 | Hotelling | |
| 2009/0280858 A1* | 11/2009 | Ahn | H04M 1/72577 |
| | | | 455/550.1 |
| 2010/0052899 A1* | 3/2010 | Bruce | A61B 5/0002 |
| | | | 340/539.12 |
| 2010/0099354 A1* | 4/2010 | Johnson | H04M 1/7253 |
| | | | 455/41.1 |
| 2011/0050620 A1 | 3/2011 | Hristov | |
| 2011/0057899 A1 | 3/2011 | Sleeman et al. | |
| 2011/0065375 A1* | 3/2011 | Bradley | H04M 1/72577 |
| | | | 455/1 |
| 2011/0185048 A1 | 7/2011 | Yew et al. | |
| 2011/0250840 A1* | 10/2011 | Lee | H04W 52/028 |
| | | | 455/41.1 |
| 2013/0214909 A1* | 8/2013 | Meijers | H04W 4/029 |
| | | | 340/10.5 |
| 2013/0237152 A1* | 9/2013 | Taggar | H04B 5/00 |
| | | | 455/41.1 |
| 2014/0134990 A1* | 5/2014 | Chou | H04W 52/0235 |
| | | | 455/418 |
| 2014/0154987 A1* | 6/2014 | Lee | H04W 76/14 |
| | | | 455/41.2 |
| 2014/0329518 A1* | 11/2014 | Gruberman | H04W 8/245 |
| | | | 455/419 |
| 2015/0056972 A1* | 2/2015 | Bartlett | H04M 1/72563 |
| | | | 455/418 |
| 2015/0178362 A1* | 6/2015 | Wheeler | G06F 9/44505 |
| | | | 707/639 |
| 2016/0213291 A1* | 7/2016 | Mears | G06F 19/3468 |

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Office Action from Chinese Patent Application No. 201380079206.1, dated Apr. 28, 2018, 13 pages.

\* cited by examiner

MULTI-DEVICE WIRELESS DISABLE AND ENABLE

CROSS-REFERENCE TO RELATED APPLICATIONS

This application is a National Phase application under 35 U.S.C. § 371 of International Application No. PCT/US2013/057417, filed Aug. 29, 2013, the content of which is hereby incorporated by reference in its entirety for all intended purposes.

FIELD OF THE DISCLOSURE

This relates generally to wireless communication between computing devices, and more particularly, in one example, to the selective enabling and disabling of a set of paired devices by having the user actively enable and disable one of the devices associated with the set of paired devices.

BACKGROUND OF THE DISCLOSURE

Computing devices such as desktop computers, laptop computers, mobile phones, smartphones, watches, tablet devices and portable multimedia players are popular. These computing devices can be used for performing a wide variety of tasks, from the simple to the most complex.

In some instances, computing devices can communicate wirelessly over wireless networks. For example, computing devices can communicate over wireless networks based on the Institute of Electrical and Electronics Engineers (IEEE) 802.11 family of standards, also referred to as "WiFi". The standards (including 802.11a, 802.11b, 802.11g and 802.11a) define frequency, modulation, data rates, and message formats for communicating information between devices. In general, in an 802.11 compliant wireless network (also referred to as a "WiFi network"), there is a designated "access point," often with a wired connection to the Internet, that manages the WiFi network. Among other operations, the access point can route messages between networked client devices. The WiFi network often has a name (generally configurable by a network administrator interfacing with the access point) which the access point can periodically broadcast, and client devices that know the name or can discover the network name from the access point's broadcast and can join the network by sending requests to join the access point. Computing devices can communicate wirelessly over other communication standards as well. For example, computing devices can use Bluetooth, Bluetooth Low Energy (LE), Zigbee, etc. Furthermore, multiple wireless devices can also communicate with each other via the same communication links that can be used to communicate with wireless access points. When a user is in possession of multiple devices, each device can be paired with each other, for instance, via Bluetooth or Bluetooth Low Energy (LE) connection. By pairing multiple devices together, changing the settings in one device can be mirrored on the other devices such that a user does not have to change the same settings multiple times in multiple devices.

As an example, when a user possesses multiple devices on their person and wants to set each and every device into an airplane mode (if they are travelling, for instance) it may become cumbersome and tedious to set each and every device individually to an airplane mode.

SUMMARY

This relates to a wireless device that can transmit and receive commands to enter and exit an airplane mode based on whether the device is paired to other wireless devices. For example, a first wireless device can be set to enter airplane mode by a user. It can then check to see if there are any other wireless devices that are paired to it, and if any paired devices are found, it can transmit a command to the other paired devices to also enter airplane mode. If the wireless device is subsequently commanded to exit the airplane mode by the user, the device can transmit a signal to the other devices that were paired to it to command the devices to exit the airplane mode.

DETAILED DESCRIPTION

In the following description of examples, reference is made to the accompanying drawings which form a part hereof, and in which it is shown by way of illustration specific examples of the disclosure that can be practiced. It is to be understood that other examples can be used and structural changes can be made without departing from the scope of the examples of this disclosure.

This relates to a method of selectively enabling and disabling airplane mode or other configurations in a plurality of wireless devices that have been paired together.

Although examples disclosed herein may be described and illustrated herein in terms of the IEEE 802.11 standard communications protocol, it should be understood that the examples are not so limited, but are additionally applicable to other wireless communications protocols in which wireless devices can communicate with each other. Furthermore, although examples may be described and illustrated herein in terms of selectively enabling and disabling airplane mode in a plurality of wireless devices that have been paired together, it should be understood that the examples are also applicable to other types of functions in wireless devices such as putting a device into a silent mode.

Figure 1:
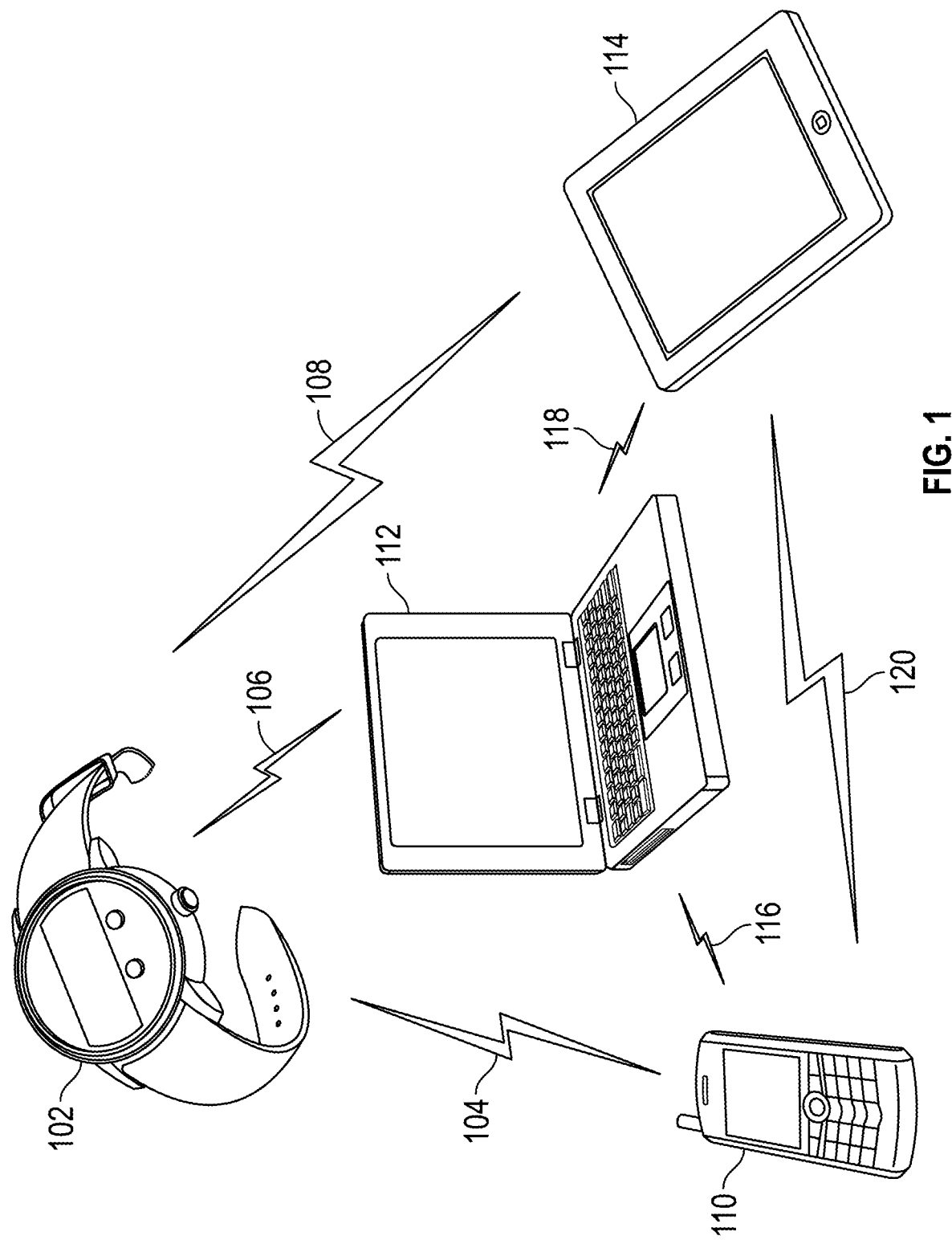
FIG. 1 illustrates a plurality of wireless devices that are paired together via a plurality of communication links according to examples of the disclosure.

FIG. 1 illustrates a plurality of wireless devices that are paired together via a plurality of communication links according to examples of the disclosure. In this example, wireless device 102 can be paired with a plurality of wireless devices 110, 112, and 114. Pairing can refer to wireless devices 102, 110, 112 and 114 establishing a series of direct communication links with one another. In some examples, wireless devices 102, 110, 112 and 114 can establish communications links 104, 106, 108, 116, 118, and 120 such that each and every device in the plurality of devices has a direct communication link with all of the other devices in the group. In some examples, links 104, 106, 108, 116, 118 and 120 can be established using Bluetooth LE and its associated communications protocol. Bluetooth LE is used only as an example and the disclosure is not so limited and can also include other known communication methods such as near field communication protocols (NFC). Once a link has been established between devices 102, 110, 112 and 114, thus making the devices paired together, the devices can share information with each other.

Air travelers today can carry multiple wireless devices wherever they may go. It is not uncommon to see a traveler with a phone, a tablet, and a laptop computer. Some also carry dedicated MP3 players (i.e. iPods) and other devices (i.e. watches, health monitors, etc.) that may be have wireless capability. During a flight, the airline may require that these wireless devices have their wireless capabilities disabled during the duration of the flight. One option an air traveler has is to completely power off each and every of their wireless devices. However in some scenarios, the user may wish to continue to use the devices while still shutting off the wireless functionality of the devices. One option an air traveler has is to put their wireless device into an airplane mode. "Airplane mode" is a setting on mobile phones and other wireless devices that, when engaged, disables operation of radio frequency (wireless) chipsets and antennas in the device. Airplane mode exists because airlines allow the use of electronics on airplanes, but not the use of their internal wireless transmitters. In order to be able to use the non-radio features of a mobile phone, music player, or other electronic device, airplane mode can be enabled. Otherwise, any device with an antenna needs to be turned off for the duration of a flight.

When a user is in possession of multiple wireless devices, it may become cumbersome and tedious to set each and every device into airplane mode. Therefore, a set of wireless devices can take advantage of the pairing feature discussed above such that when one of the devices is set to airplane mode, the other devices that are paired to it can also be set into airplane mode without any intervention from the user.

Figure 2:
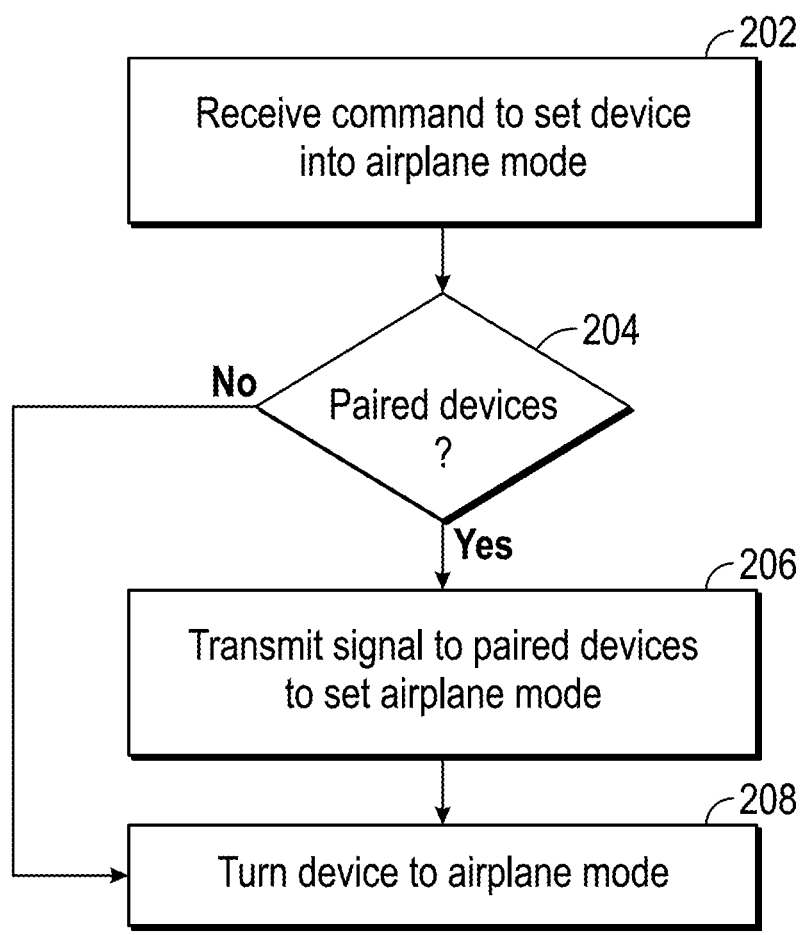
FIG. 2 illustrates an exemplary method of setting a plurality of paired wireless devices to airplane mode according to examples of the disclosure.

FIG. 2 illustrates an exemplary method of setting a plurality of paired wireless devices to airplane mode according to examples of the disclosure. At step 202 a wireless device can receive a command from a user to set the device into an airplane mode. Upon receiving the command, the device can ascertain whether there are any devices that are paired to it. Pairing can be accomplished as described above with respect to FIG. 1. Deciding which devices are to be paired can be brought about in many ways. In one example, devices can be grouped into a "travel set," automatically by proximity. In other words, the device can become paired with other devices when the device detects that it is in close proximity to another device. Upon detecting that a device is nearby, the user can be given the option to pair the device with the other device in its proximity. In another example, the travel set can be chosen manually by the user. The user can, for instance, access a cloud computing platform in which each and every device the user owns can be registered. The user can then manually choose which devices are to be in the travel set.

If no paired devices are found, the method can proceed to step 208 and the device can be turned to airplane mode. If paired devices exist, the method can move to step 206 in which a signal is transmitted to the paired devices that commands the paired devices to enter airplane mode. In other words, when one device in a travel set is set to airplane mode, it can send a signal to all devices in the travel set that commands those devices to go into airplane mode. For example, if a user is wearing a Bluetooth enabled wristwatch, and the watch is set into airplane mode, the user's phone, tablet, mp3 player, and laptop can all be set to airplane mode automatically. Once the signal has been transmitted, the method can move to step 208 in which the device can be set to airplane mode.

Once the devices are in airplane mode, their wireless communications functionality may be turned off. This can mean that the devices will no longer be paired with each other since they can no longer communicate with each other. Therefore, if a device subsequently is taken out of airplane mode by a user, it may not be able to transmit a signal via a communications link described above to alert the previously paired devices to also disengage the airplane mode. This can mean that a user would have to manually switch the airplane mode off on each and every device in their possession. This process can be cumbersome and tedious.

Figure 3:
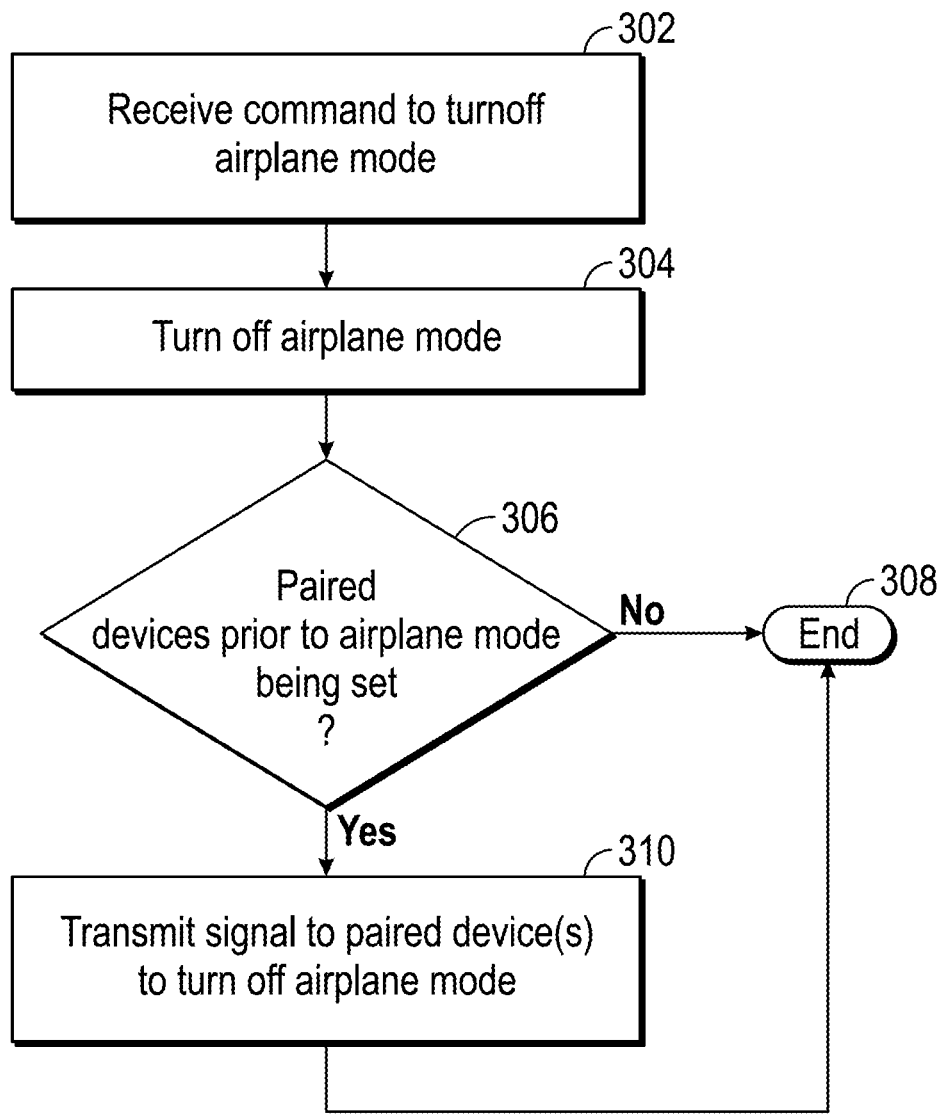
FIG. 3 illustrates an exemplary method for setting a plurality of paired wireless devices to exit airplane mode according to examples of the disclosure.

FIG. 3 illustrates an exemplary method for setting a plurality of paired wireless devices to exit airplane mode according to examples of the disclosure. At step 302, a wireless device can receive a user command to turnoff or deactivate the airplane mode. At step 304 the device can engage in the process of deactivating the airplane mode (i.e., reactivate any wireless transmitters). At step 306, the device can determine if there were any other devices that were paired to it prior to the airplane mode being activated. In one example, the paired devices could maintain a table of other devices that were recently paired to it, and the devices could check to the table to determine if there were any other devices that were paired to it prior to the airplane mode being activated. If there were none, the method can be terminated at step 308. However, if the device determines that there were other devices that were paired to it prior to the airplane mode being activated, the method can move to step 308 and the device can transmit a signal to the paired devices in order to deactivate airplane mode of the paired devices. As discussed above, since the wireless transmitters of the paired devices have been deactivated because the devices are in airplane mode, the devices may not be able to communicate with one another using wireless communications. Therefore, the devices may have to communicate with one other using alternative methods. In one example, an inaudible (to the human ear) high-pitched coded tone could be emitted from the device activated at step 302 with a speaker, and the other devices could listen for that tone with a microphone. Once the other devices detect the tone being emitted, they can automatically deactivate the airplane mode setting. The tone could be coded such that each 'travel set' could have a unique tone, thus only deactivating the airplane mode in the devices within the travel set. The coded tone could be sent using the communication links described above at a time directly before the devices are set to airplane mode. Alternatively, the plane could emit the tone alerting all devices within the cabin that they may deactivate airplane mode.

Alternatively to the method illustrated in FIG. 3, each device in the travel set could independently monitor ambient conditions of the device and make a determination as to when to deactivate airplane mode. In one example, one or all of the devices in the travel set can listen to ambient noises and speech to determine that the airplane has landed. For instance, if the ambient noise falls below a certain threshold indicating that the engine of an airplane is no longer running, then the device can automatically deactivate airplane mode.

In another example, one or all of the devices can use speech recognition algorithms and listen for a particular phrase of speech such as a flight attendant announcing that "it is now safe to use your cellular phone." A voice recognition algorithm stored in the device can interpret the voice and determine the situation in which airplane mode can be safely switched off. This voice recognition method could also be used to activate airplane mode, for instance, when a flight attendant says "please turn of all electronics."

In another example, one or all of the devices could employ an accelerometer to determine if there are any sudden decelerations that would be indicative of an airplane landing. In another example, the device could detect the ambient barometric pressure of the device and deactivate airplane mode once the device encounters a change in barometric pressure indicative of a plane that has landed. In another example, the device can detect the presence of cellular towers or wireless routers and automatically deactivate airplane mode.

In one example, the user of a device can use a calendar program of the device to notify the device that it will be on a plane for a certain duration of time. The device can determine when the duration of time has lapsed and automatically deactivate airplane mode. For instance, if the device is notified that the user will be on a flight that takes off from 2:00 p.m. and will land at 5:00 p.m., the device can automatically deactivate airplane mode once the time is past 5:00 p.m. If the user sets the calendar notification to one device, the device can alert the other devices to the notification prior to going into airplane mode.

Other examples of the disclosure can employ communications methods similar to those above to configure paired devices in ways other than turning on or off airplane mode. In one example, one paired device can be set by a user to enter a silent mode of operation when the user does not want to disturb others in the vicinity. That device can then notify other paired devices to also enter a silent mode of operation, or some alternative audio setting. In some examples, a paired device can be configured using a calendar or clock program to have it, other paired devices, automatically enter a silent mode of operation during regular sleeping hours. In yet another example, changing the audio alert setting on one device can cause that device to communicate with other devices to either conform to that same sound (so that activity on any of the user's paired devices can be easily identified), or alternatively change a paired device having that same alert to another sound, so that each of the user's devices emits unique alert sounds. In general, changes to the configurations and settings of one paired device, whether performed manually or automatically, can be propagated to other paired devices using the methods described above.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 4:
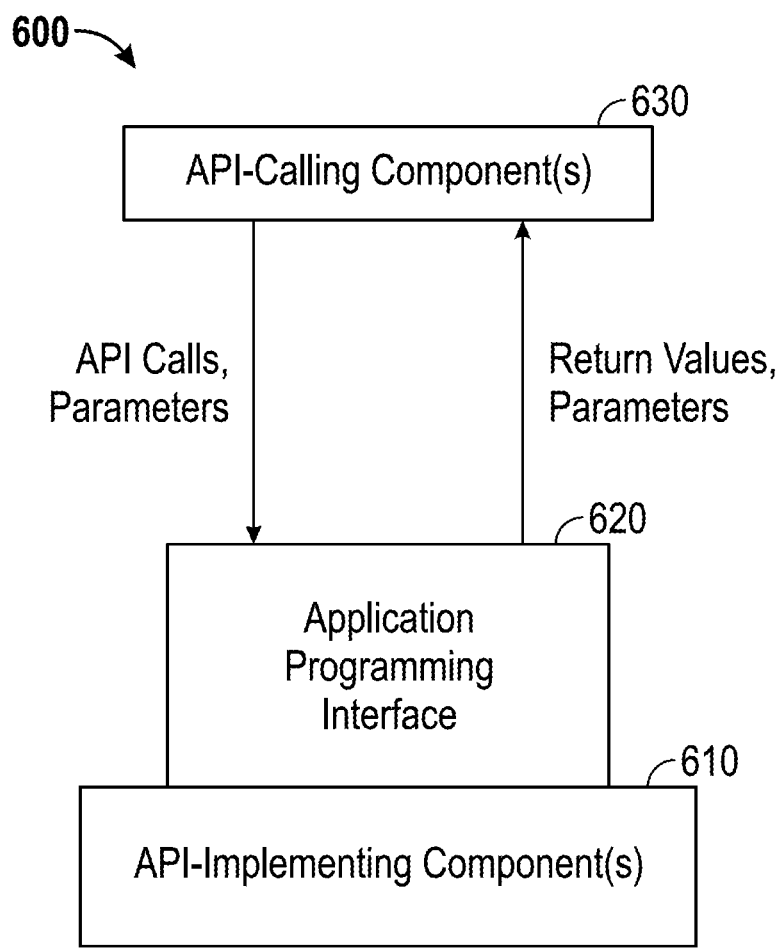
FIG. 4 is a block diagram illustrating an exemplary API architecture, which may be used in some examples of the disclosure.

FIG. 4 is a block diagram illustrating an exemplary API architecture, which may be used in some examples of the disclosure. As shown in FIG. 4, the API architecture 600 includes the API-implementing component 610 (e.g., an operating system, a library, a device driver, an API, an application program, software or other module) that implements the API 620. The API 620 specifies one or more functions, methods, classes, objects, protocols, data structures, formats and/or other features of the API-implementing component that may be used by the API-calling component 630. The API 620 can specify at least one calling convention that specifies how a function in the API-implementing component receives parameters from the API-calling component and how the function returns a result to the API-calling component. The API-calling component 630 (e.g., an operating system, a library, a device driver, an API, an application program, software or other module), makes API calls through the API 620 to access and use the features of the API-implementing component 610 that are specified by the API 620. The API-implementing component 610 may return a value through the API 620 to the API-calling component 630 in response to an API call.

It will be appreciated that the API-implementing component 610 may include additional functions, methods, classes, data structures, and/or other features that are not specified through the API 620 and are not available to the API-calling component 630. It should be understood that the API-calling component 630 may be on the same system as the API-implementing component 610 or may be located remotely and accesses the API-implementing component 610 using the API 620 over a network. While FIG. 4 illustrates a single API-calling component 630 interacting with the API 620, it should be understood that other API-calling components, which may be written in different languages (or the same language) than the API-calling component 630, may use the API 620.

The API-implementing component 610, the API 620, and the API-calling component 630 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 5:
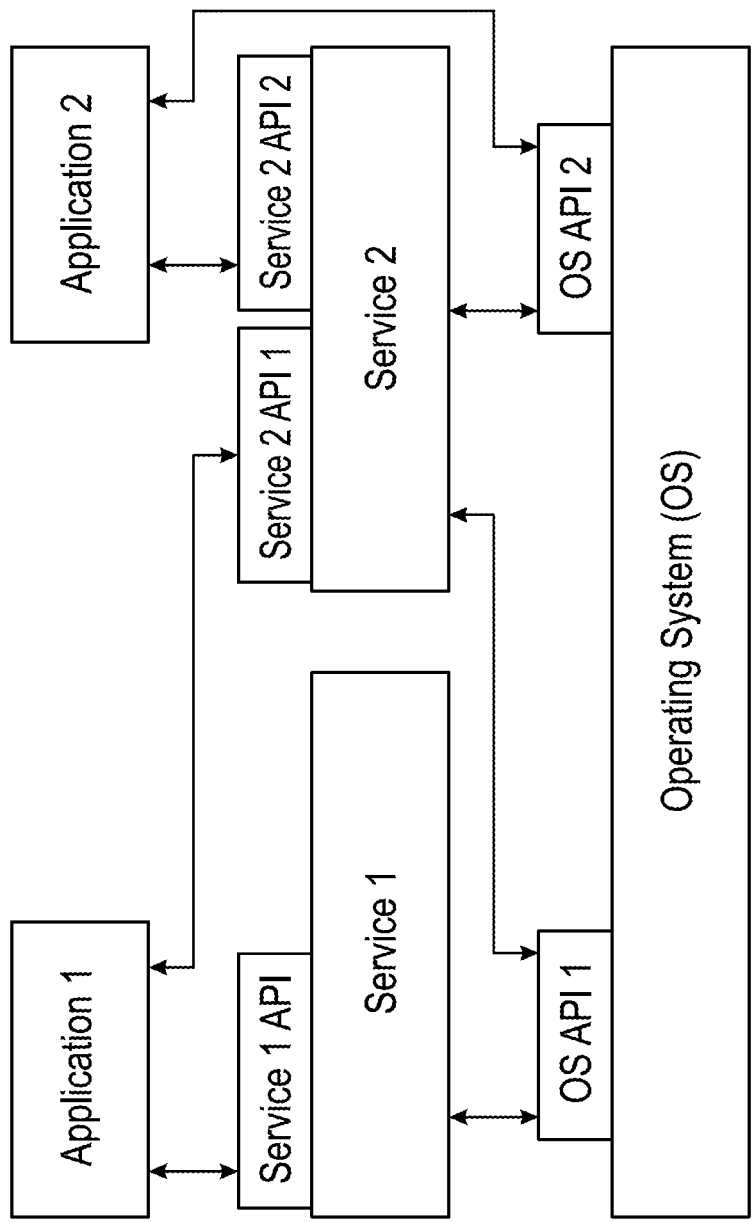
FIG. 5 illustrates an exemplary software stack of an API according to examples of the disclosure.

In the exemplary software stack shown in FIG. 5, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 6:
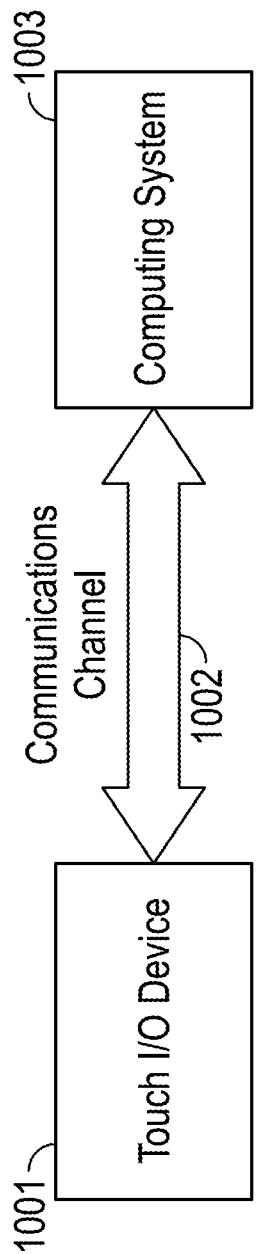
FIG. 6 is a block diagram illustrating exemplary interactions between the touch screen and other components of the device according to examples of the disclosure.

FIG. 6 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 7:
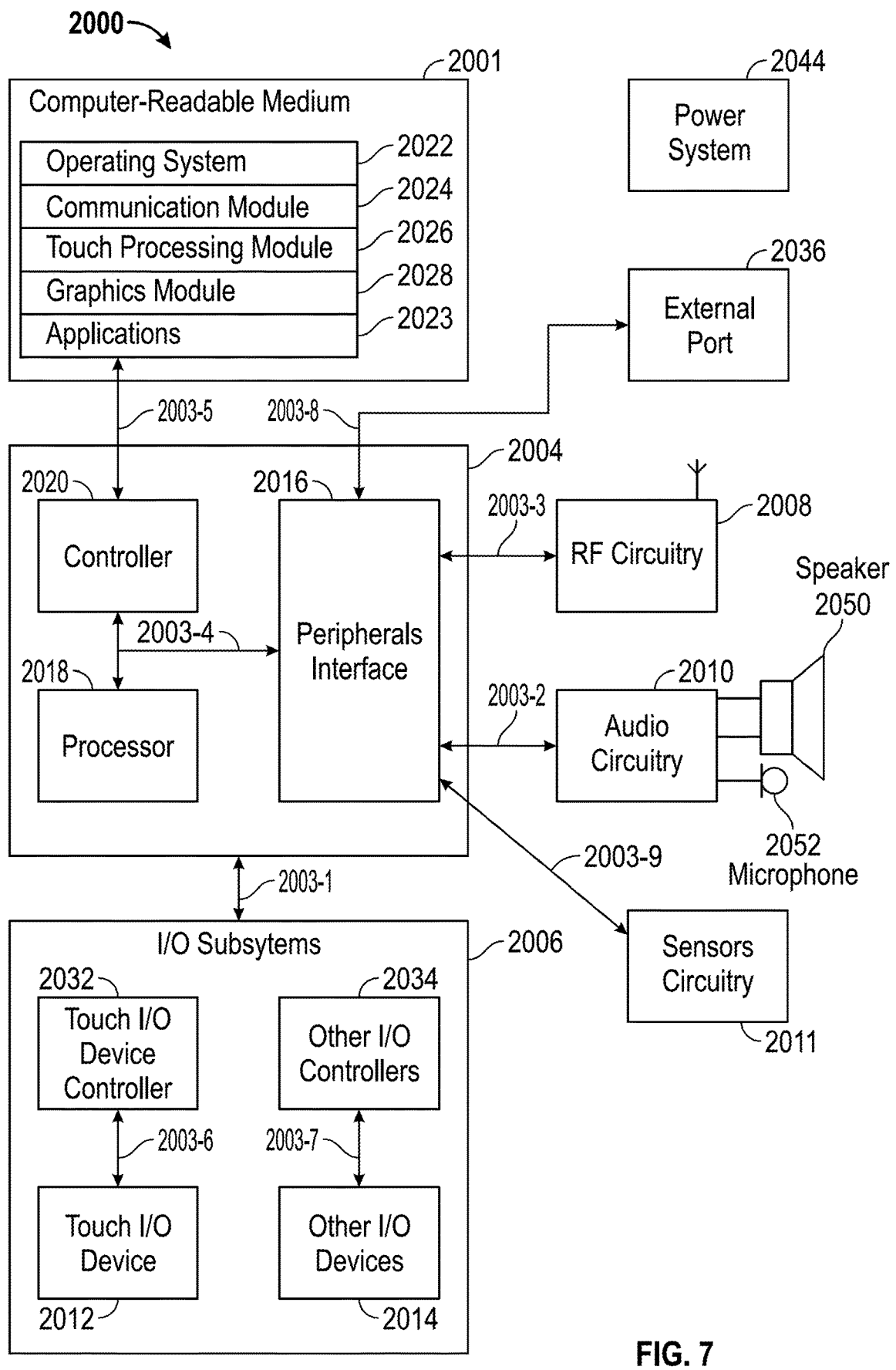
FIG. 7 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 7 is a block diagram of one example of system 2000 that generally includes one or more computer-readable media 2001, processing system 2004, I/O subsystem 2006, radio frequency (RF) circuitry 2008, audio circuitry 2010, and gaze detection circuitry 2011. These components may be coupled by one or more communication buses or signal lines 2003.

It should be apparent that the architecture shown in FIG. 7 is only one example architecture of system 2000, and that system 2000 could have more or fewer components than shown, or a different configuration of components. The various components shown in FIG. 7 can be implemented in hardware, software, firmware or any combination thereof, including one or more signal processing and/or application specific integrated circuits.

RF circuitry 2008 can be used to send and receive information over a wireless link or network to one or more other devices and includes well-known circuitry for performing this function. RF circuitry 2008 and audio circuitry 2010 can be coupled to processing system 2004 via peripherals interface 2016. Interface 2016 can include various known components for establishing and maintaining communication between peripherals and processing system 2004. Audio circuitry 2010 can be coupled to audio speaker 2050 and microphone 2052 and can include known circuitry for processing voice signals received from interface 2016 to enable a user to communicate in real-time with other users. In some examples, audio circuitry 2010 can include a headphone jack (not shown). Sensors circuitry 2011 can be coupled to various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, and various system sensors which can sense remaining battery life, power consumption, processor speed, CPU load, and the like.

Peripherals interface 2016 can couple the input and output peripherals of the system to processor 2018 and computer-readable medium 2001. One or more processors 2018 communicate with one or more computer-readable media 2001 via controller 2020. Computer-readable medium 2001 can be any device or medium that can store code and/or data for use by one or more processors 2018. In some examples, medium 2001 can be a non-transitory computer-readable storage medium. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 can run various software components stored in medium 2001 to perform various functions for system 2000. In some examples, the software components can include operating system 2022, communication module (or set of instructions) 2024, touch processing module (or set of instructions) 2026, graphics module (or set of instructions) 2028, and one or more applications (or set of instructions) 2030. Each of these modules and above noted applications can correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 2001 may store a subset of the modules and data structures identified above. Furthermore, medium 2001 may store additional modules and data structures not described above.

Operating system 2022 can include various procedures, sets of instructions, software components and/or drivers for controlling and managing general system tasks (e.g., memory management, storage device control, power management, etc.) and facilitates communication between various hardware and software components.

Communication module 2024 can facilitate communication with other devices over one or more external ports 2036 or via RF circuitry 2008 and can include various software components for handling data received from RF circuitry 2008 and/or external port 2036.

Graphics module 2028 can include various known software components for rendering, animating and displaying graphical objects on a display surface. In examples in which touch I/O device 2012 is a touch sensing display (e.g., touch screen), graphics module 2028 can include components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 can include various software components for performing various tasks associated with touch I/O device 2012 including but not limited to receiving and processing touch input received from I/O device 2012 via touch I/O device controller 2032.

I/O subsystem 2006 can be coupled to touch I/O device 2012 and one or more other I/O devices 2014 for controlling or performing various functions. Touch I/O device 2012 can communicate with processing system 2004 via touch I/O device controller 2032, which can include various components for processing user touch input (e.g., scanning hardware). One or more other input controllers 2034 can receive/send electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 can display visual output to the user in a GUI. The visual output may include text, graphics, video, and any combination thereof. Some or all of the visual output may correspond to user-interface objects. Touch I/O device 2012 can form a touch sensing surface that accepts touch input from the user. Touch I/O device 2012 and touch screen controller 2032 (along with any associated modules and/or sets of instructions in medium 2001) can detect and track touches or near touches (and any movement or release of the touch) on touch I/O device 2012 and can convert the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

In examples for which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 can also include power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Therefore, according to the above, some examples of the disclosure are directed to a first wireless device, the first wireless device comprising: circuitry configured for communicating with a second wireless device; and a processor capable of: receiving input as to a desired mode of the device; determining if the first wireless device is connected to the second wireless device; and transmitting information associated with the desired mode to the second wireless device if it is determined that the first wireless device is connected to the second wireless device; and setting a mode of the device based on the desired mode. Additionally or alternatively to one or more of the examples disclosed above, in some examples, determining if the first wireless device is connected to the second wireless device includes determining whether the first wireless device and the second wireless device have previously been grouped together into a travel set. Additionally or alternatively to one or more of the examples disclosed above, in some examples, the desired mode of the device can include selectively enabling and disabling an airplane mode of the device. Additionally or alternatively to one or more of the examples disclosed above, in some examples, the desired mode of the device can include selectively enabling and disabling a silent mode of the device.

Some examples of the disclosure are directed to a method of transmitting information associated with a desired mode of operation of the device, the method comprising: receiving input as to a desired mode of the device; determining if the first wireless device is connected to a second wireless device; and transmitting information associated with the desired mode to the second wireless device if it is determined that the first wireless device is connected to the second wireless device; and setting a mode of the device based on the desired mode. Additionally or alternatively to one or more of the examples disclosed above, in some examples, determining if the first wireless device is connected to the second wireless device includes determining whether the first wireless device and the second wireless device have previously been grouped together into a travel set. Additionally or alternatively to one or more of the examples disclosed above, in some examples, the desired mode of the device can include selectively enabling and disabling an airplane mode of the device. Additionally or alternatively to one or more of the examples disclosed above, in some examples, the desired mode of the device can include selectively enabling and disabling a silent mode of the device.

Some examples of the disclosure are directed to a non-transitory computer readable storage medium having stored thereon a set of instructions for transmitting information associated with a desired mode of operation of the device, that when executed by a processor causes the processor to: receive one or more inputs as to a desired mode of the device; determine if the first wireless device is connected to a second wireless device; and transmit information associated with the desired mode to the second wireless device if it is determined that the first wireless device is connected to the second wireless device; and set a mode of the device based on the desired mode. Additionally or alternatively to one or more of the examples disclosed above, in some examples, determining if the first wireless device is connected to the second wireless device includes determining whether the first wireless device and the second wireless device have been previously been grouped together into a travel set. Additionally or alternatively to one or more of the examples disclosed above, in some examples, the desired mode of the device can include selectively enabling and disabling an airplane mode of the device. Additionally or alternatively to one or more of the examples disclosed above, in some examples, the desired mode of the device can include selectively enabling and disabling a silent mode of the device.

Some examples of the disclosure are directed to a first wireless device, the first wireless device comprising: circuitry configured for communicating with a second wireless device; and a processor capable of: receiving information from the second wireless device, the information being associated with the second wireless device's mode of operation; and setting a mode of the first wireless device based on the information of the second wireless device's mode of operation. Additionally or alternatively to one or more of the examples disclosed above, in some examples, the second device's mode of operation can include enabling and disabling an airplane mode of the device.

Some examples of the disclosure are directed to a method of configuring a first wireless device's mode of operation, the method comprising: receiving information from a second wireless device, the information being associated with the second wireless device's mode of operation; and setting a mode of the first wireless device based on the information of the second wireless device's mode of operation. Additionally or alternatively to one or more of the examples disclosed above, in some examples, receiving the information can include communicating with the second wireless device over a wireless network connection. Additionally or alternatively to one or more of the examples disclosed above, in some examples, the second device's mode of operation can include enabling and disabling an airplane mode of the device. Additionally or alternatively to one or more of the examples disclosed above, in some examples, the second device's mode of operation can include enabling and disabling a silent mode of the device. Additionally or alternatively to one or more of the examples disclosed above, in some examples, receiving the information can include communicating with the second wireless device over a wireless network connection. Additionally or alternatively to one or more of the examples disclosed above, in some examples, the second device's mode of operation can include enabling and disabling an airplane mode of the device. Additionally or alternatively to one or more of the examples disclosed above, in some examples, the second device's mode of operation can include enabling and disabling a silent mode of the device.

Some examples of the disclosure are directed to a non-transitory computer readable storage medium having stored thereon a set of instructions for configuring a first wireless device's mode of operation, that when executed by a processor causes the processor to: receive information from a second wireless device, the information being associated with the second wireless device's mode of operation; and set a mode of the first wireless device based on the information of the second wireless device's mode of operation.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A first wireless device comprising:
   circuitry configured to communicate with a second wireless device; and
   a processor configured to:
      receive input indicating a desired mode of the first wireless device, the desired mode comprising enabling or disabling a radio frequency communication channel;
      determine if the first wireless device is connected to the second wireless device via a first communication channel that comprises the radio frequency communication channel;
      transmit a signal comprising information associated with disabling the radio frequency communication channel and representing a tone associated with enabling the radio frequency communication channel to the second wireless device over the first communication channel when the first wireless device is connected to the second wireless device via the first communication channel;
      transmit the tone to the second wireless device via a second communication channel that comprises a non-radio frequency communication channel when the first wireless device is not connected to the second wireless device via the first communication channel; and
      setting a mode of the first wireless device based on the desired mode.

2. The first wireless device of claim 1, wherein determining if the first wireless device is connected to the second wireless device includes determining whether the first wireless device and the second wireless device have previously been grouped together into a travel set.

3. The first wireless device of claim 1, wherein the desired mode of the first wireless device includes selectively enabling and disabling an airplane mode of the first wireless device; and
   wherein disabling the airplane mode comprises enabling the first communication channel and enabling the airplane mode comprises disabling the first communication channel but not the second communication channel.

4. The first wireless device of claim 1, wherein the desired mode of the first wireless device includes selectively enabling and disabling a silent mode of the first wireless device.

5. A method comprising:
   receiving input indicating a desired mode of a first wireless device, the desired mode comprising enabling or disabling a radio frequency interface configured to communicate via a radio frequency channel;
   determining if the first wireless device is connected to a second wireless device via the radio frequency channel;
   transmitting a signal comprising information associated with disabling the radio frequency interface and representing a tone associated with enabling the radio frequency interface to the second wireless device via the radio frequency channel when it is determined that the first wireless device is connected to the second wireless device via the radio frequency channel;
   transmitting the tone to the second wireless device via a non-radio frequency channel when it is determined that the first wireless device is not connected to the second wireless device via the radio frequency channel; and
   setting a mode of the first wireless device based on the desired mode.

6. The method of claim 5, wherein determining if the first wireless device is connected to the second wireless device includes determining whether the first wireless device and the second wireless device have been previously been grouped together into a travel set.

7. The method of claim 5, wherein the signal indicates that the radio frequency channel should be disabled at the second wireless device and the tone indicates that the radio frequency channel should be enabled at the second wireless device.

8. The method of claim 5, wherein the desired mode of the first wireless device includes selectively enabling and disabling a silent mode of the first wireless device.

9. The method of claim 5, further comprising:
   receiving, by the second wireless device, the signal comprising the information associated with the desired mode of the first wireless device and the tone via the radio frequency channel when the second wireless device is connected to the first wireless device;
   receiving the tone via the non-radio frequency channel when the second wireless device is not connected to the first wireless device;
   setting, by the second wireless device, a mode of the second wireless device based on the received signal comprising the information associated with the desired mode of the first wireless device when the second wireless device is connected to the first wireless device; and
   setting, by the second wireless device, the mode of the second wireless device based on the tone received via the non-radio frequency channel when the second wireless device is not connected to the first wireless device.

10. The method of claim 9, wherein the signal is associated with disabling the radio frequency channel and the tone is associated with enabling the radio frequency channel.

11. The method of claim 9, wherein setting, by the second wireless device, the mode of the second wireless device comprises enabling or disabling an airplane mode of the second wireless device.

12. The method of claim 9, wherein setting, by the second wireless device, the mode of the second wireless device comprises enabling and disabling a silent mode of the second wireless device.

13. A non-transitory computer readable storage medium having stored thereon a set of instructions that when executed by a processor causes the processor to:
   receive one or more inputs indicating a desired mode of a first wireless device, the desired mode comprising enabling or disabling a radio frequency interface configured to communicate via a radio frequency channel;
   determine if the first wireless device is connected to a second wireless device via the radio frequency channel;
   transmit a signal to the second wireless device via the radio frequency channel when the desired mode comprises disabling the radio frequency interface and it is determined that the first wireless device is connected to the second wireless device via the radio frequency channel, the signal comprising information associated with disabling, at the second wireless device, a second radio frequency interface and representing a tone associated with enabling the second radio frequency interface;
   transmit the tone associated with enabling the second radio frequency interface to the second wireless device via a non-radio frequency channel when the desired mode comprises enabling the radio frequency channel and it is determined that the first wireless device is not connected to the second wireless device via the radio frequency channel; and set a mode of the first wireless device based on the desired mode.

14. The non-transitory computer readable storage medium of claim 13, wherein determining if the first wireless device is connected to the second wireless device includes determining whether the first wireless device and the second wireless device have been previously been grouped together into a travel set.

15. The non-transitory computer readable storage medium of claim 13, wherein the desired mode of the first wireless device includes selectively enabling and disabling an airplane mode of the first wireless device.

16. A system comprising:
a first wireless device configured to:
receive input indicating a desired mode of the first wireless device, the desired mode comprising enabling or disabling radio frequency communication of the first wireless device;
determine if the first wireless device is connected to a second wireless device via the radio frequency communication;
in response to a determination that the first wireless device is connected to the second wireless device via the radio frequency communication, transmit, to the second wireless device via the radio frequency communication, a first signal comprising information associated with the desired mode and comprising information associated with enabling the radio frequency communication, the information associated with enabling the radio frequency communication representing a non-radio frequency tone associated with enabling the radio frequency communication; and
set a mode of the first wireless device based on the desired mode.

17. The system of claim 16, wherein the first wireless device is configured to determine if the first wireless device is connected to the second wireless device by determining whether the first wireless device and the second wireless device have previously been grouped together into a travel set, the grouping being separate from both connecting and pairing the first wireless device to the second wireless device.

18. The system of claim 16, further comprising:
the second wireless device configured to:
receive, from the first wireless device, the information associated with the desired mode of the first wireless device and the information associated with enabling radio frequency communication; and
set a mode of the second wireless device based on the received information associated with the desired mode of the first wireless device, the mode comprising disabling radio frequency communication of the second wireless device.

19. The system of claim 18, wherein the second wireless device is further configured to receive, from the first wireless device, the information associated with the desired mode of the first wireless device and the information associated with enabling radio frequency communication over a wireless network connection.

20. The system of claim 18, wherein the second wireless device is further configured to:
receive, while the radio frequency communication of the second wireless device is disabled, the non-radio frequency signal associated with enabling the radio frequency communication; and
enable the radio frequency communication of the second wireless device responsive to receiving the non-radio frequency signal.

21. The system of claim 20, wherein the non-radio frequency tone comprises a sound signal.

22. The system of claim 16, wherein the first wireless device is further configured to:
in response to a determination that the first wireless device is not connected to the second wireless device, transmit, to the second wireless device, the non-radio frequency tone associated with enabling the radio frequency communication.

23. A method comprising:
grouping, by a first wireless device accessing a cloud computing platform, the first wireless device into a travel set with a second wireless device, wherein the grouping comprises associating the first wireless device and the second wireless device with a non-radio frequency tone, that, when detected by the first or second wireless device in the travel set, causes the first or second wireless device to enable radio frequency communication;
receiving, by the first wireless device, input indicating a desired mode of the first wireless device, the desired mode comprising disabling the radio frequency communication;
determining that the first wireless device was previously grouped in the travel set with the second wireless device, the grouping being separate from connecting the first wireless device to the second wireless device;
transmitting, via the radio frequency communication, a signal associated with the desired mode to the second wireless device responsive to the determination that the first wireless device was previously grouped in the travel set with the second wireless device, the signal comprising information associated with disabling the radio frequency communication and representing the non-radio frequency tone that, when detected, causes the second wireless device to enable the radio frequency communication; and
setting a mode of the first wireless device based on the desired mode.

24. The method of claim 23, wherein the travel set corresponds to a user account and the non-radio frequency tone associated with the travel set differs from another non-radio frequency signal associated with another travel set corresponding to another user account.

25. A computer program product comprising code stored in a non-transitory computer-readable storage medium, the code comprising:
code to receive input indicating a desired mode of a first wireless device, the desired mode comprising enabling or disabling a radio frequency channel;
code to determine whether the first wireless device was previously grouped in a travel set with a second wireless device, the grouping being separate from connecting the first wireless device to the second wireless device, the travel set being associated with a user account;
code to transmit a signal to the second wireless device if it is determined that the first wireless device was previously grouped in the travel set with the second wireless device and when the desired mode comprises disabling the radio frequency channel, wherein the travel set is associated with a non-radio frequency tone that, when detected by a device in the travel set, causes the device to enable the radio frequency channel, the non-radio frequency tone associated with the travel set being different than another non-radio frequency tone associated with another travel set associated with another user account that differs from the user account, and the signal comprising information associated with disabling the radio frequency channel and representing the non-radio frequency tone; and code to set a mode of the first wireless device based on the desired mode.

26. The computer program product of claim 25, wherein the non-radio frequency tone comprises an audio tone.

\* \* \* \* \*